UNITED STATES PATENT OFFICE.

ALEXANDER ULICH, OF ST. PETERSBURG, RUSSIA, ASSIGNOR TO H. AMELUNG & CO., OF SAME PLACE.

PROCESS OF MANUFACTURING ARTIFICIAL STONES.

SPECIFICATION forming part of Letters Patent No. 644,953, dated March 6, 1900.

Application filed December 12, 1898. Serial No. 699,058. (No specimens.)

*To all whom it may concern:*

Be it known that I, ALEXANDER ULICH, a subject of the Emperor of Russia, residing at St. Petersburg, in the Empire of Russia, have invented new and useful Improvements in Processes of Manufacturing Artificial Stones, of which the following is a specification.

My invention relates to a new process for manufacturing artificial stones which are proof against frosty weather. It is a known fact that the artificial stones hitherto known crumbled to pieces if they were exposed to rain and frost alternately, while stones manufactured according to the present process are fully frost-proof.

My invention consists in using the ingredients of the well-known Sorel cement—namely, oxid of magnesium and chlorid of magnesium—in combination with an alkaline compound, such as carbonates or hydrates of the alkalies or water-glass and amorphous silicic acid.

In carrying out my invention I proceed as follows: I mix amorphous silicic acid, preferably infusorial earth, thoroughly with oxid of magnesium, and I add after this a solution of chlorid of magnesium, having 25 to 30° Baumé. This solution acts on the oxid of magnesium, forming basic chlorid of magnesium and magnesium hydrate, as known. The proportions used may be varied between wide limits, but I prefer to use chemically-equivalent parts—that is, parts, by weight, in proportion to the total atomic weight of each ingredient employed—of silicic acid and oxid of magnesium, with enough of the solution of chlorid of magnesium to form a stiff paste. The hydrate of magnesium combines with the infusorial earth to form silicate of magnesium. Any inert materials—such as earth, sand, sawdust, &c.—can be added to the cement in case of manufacturing artificial stones. The stones are formed and stamped or pressed into shape, and after several weeks they are fully hardened, whereupon they are laid into a solution of water-glass. This water-glass decomposes the basic chlorid of magnesium, forming silicate of magnesia and chlorid of sodium. By this way any combination of magnesium has been converted into silicate of magnesia, which has been formed in the first stage of the process by the hydrate of magnesium and the infusorial earth and in the second stage by the basic chlorid of magnesium and water-glass.

The inert materials which are added may depend on the nature of the stone to be manufactured. Earth, sand, slag, marble, wood, cork, and other wastes may be used.

Instead of converting the basic chlorid of magnesium into silicate of magnesia I can also convert it into carbonate of magnesia, either by an alkali carbonate or by an alkali hydrate, and under the influence of carbonic acid—for instance, atmospheric air. In this event I mix the burnt magnesite with a solution of chlorid of magnesium, the solution having 25° to 35° Baumé. After this I add the inert materials—such as sand, slag, sawdust, and the like—and I form the stones or articles by stamping the mass into the forms. After several weeks I lay the stones or articles into a weak solution of alkali carbonate or alkali hydrate. The carbonate of alkali converts the basic chlorid of magnesium into carbonate of magnesia, while the alkali hydrate converts the chlorid at first into hydrate of magnesium, which under the action of the atmospheric air or any other carbonic acid will be converted into carbonate of magnesia.

Having now particularly described the nature of my invention and in what manner it is to be performed, I declare that what I claim is—

The process of manufacturing artificial stone, which consists in mixing together oxid of magnesium, chlorid of magnesium, amorphous silicic acid, and an inert material, shaping the mass, allowing it to harden and subjecting it to a bath of water-glass, substantially as described.

In testimony whereof I have signed my name to this specification in the presence of two subscribing witnesses.

ALEXANDER ULICH.

Witnesses:
  M. BREITFRESS,
  E. LOURIE.